US 7,842,361 B2

United States Patent
Ohta et al.

(10) Patent No.: US 7,842,361 B2
(45) Date of Patent: Nov. 30, 2010

(54) OXYGEN-ABSORBING RESIN, OXYGEN-ABSORBING RESIN COMPOSITIONS AND OXYGEN-ABSORBING CONTAINERS

(75) Inventors: Yoshihiro Ohta, Kanagawa (JP); Yoichi Ishizaki, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 12 days.

(21) Appl. No.: 12/249,397

(22) Filed: Oct. 10, 2008

(65) Prior Publication Data

US 2009/0098323 A1    Apr. 16, 2009

Related U.S. Application Data

(63) Continuation of application No. PCT/JP2007/057450, filed on Apr. 3, 2007.

(30) Foreign Application Priority Data

| Apr. 12, 2006 | (JP) | ............................. 2006-109793 |
| Jul. 11, 2006 | (JP) | ............................. 2006-190568 |

(51) Int. Cl.
*B29D 22/00* (2006.01)
*B29D 23/00* (2006.01)
*B32B 1/08* (2006.01)

(52) U.S. Cl. ................. 428/36.6; 428/35.4; 252/188.28

(58) Field of Classification Search ................ 428/35.2, 428/35.4, 35.7, 36.6, 36.7; 252/188.28
See application file for complete search history.

(56) References Cited

U.S. PATENT DOCUMENTS 6,454,965 B1 * 9/2002 Ching et al. ........... 252/188.28

| 6,527,976 B1* | 3/2003 | Cai et al. ............... 252/188.28 |
| 6,544,611 B2* | 4/2003 | Schiraldi et al. ........... 428/35.8 |
| 2005/0139806 A1* | 6/2005 | Havens et al. .......... 252/182.11 |

FOREIGN PATENT DOCUMENTS

| JP | 621824 | 7/1980 |
| JP | 3183704 | 5/1993 |
| JP | 8502306 | 3/1996 |
| JP | 09157508 | 6/1997 |
| JP | 200139475 | 2/2001 |
| JP | 2002244286 | 8/2002 |
| JP | 2003521552 | 7/2003 |
| JP | 2003253131 | 9/2003 |
| WO | 2005105887 | 11/2005 |
| WO | 2007058313 A1 | 5/2007 |

* cited by examiner

*Primary Examiner*—Michael C Miggins
(74) *Attorney, Agent, or Firm*—Hoffmann & Baron, LLP

(57) ABSTRACT

The invention aims at providing an oxygen-absorbing resin which has excellent oxygen absorption performance and which can dispense with the addition of a transition metal catalyst or the irradiation with a radiation. The invention provides an oxygen-absorbing resin which is obtained by polymerizing a raw material containing a monomer (A) having an unsaturated alicyclic structure bearing a carbon-carbon double bond wherein one carbon atom adjacent to the carbon-carbon double bond is bonded to an electron-donating substituent and a hydrogen atom and another carbon atom adjacent to the carbon atom is bonded to a heteroatom-containing functional group or a bonding group derived from the functional group with the electron-donating substituent and the functional or bonding group taking cis-configuration and which contains the unsaturated alicyclic structure in an amount of 0.5 to 10 meq/g; oxygen-absorbing resin compositions containing the above oxygen-absorbing resin; and oxygen-absorbing containers, characterized by having an oxygen-absorbing layer made from the resin or the compositions.

18 Claims, No Drawings

OXYGEN-ABSORBING RESIN, OXYGEN-ABSORBING RESIN COMPOSITIONS AND OXYGEN-ABSORBING CONTAINERS

CROSS-REFERENCE TO RELATED APPLICATIONS

This application is a continuation of International Application No. PCT/JP2007/057450, filed Apr. 3, 2007, which claims priority to Japanese Patent Application No. 2006-109793, filed Apr. 12, 2006, and Japanese Patent Application No. 2006-190568, filed Jul. 11, 2006, the contents of each of which are incorporated herein by reference.

TECHNICAL FIELD

The present invention relates to an oxygen-absorbing resin, an oxygen-absorbing resin composition containing the same and an oxygen-absorbing container prepared using the resin or the resin composition.

BACKGROUND OF THE INVENTION

Presently, various plastic containers are used for packaging because of their advantages such as light weight, transparency and easiness of molding.

However, because an oxygen barrier property of the plastic containers is lower than those of metal containers and glass containers, the plastic containers have problems in that the contents of the containers deteriorate due to chemical oxidation and the action of aerobic bacteria.

For preventing these problems, the plastic container walls have a multi-layer structure in which at least one layer is made of a resin having an excellent oxygen barrier property such as ethylene-vinyl alcohol copolymer. In addition, there are other kinds of containers having an oxygen-absorbing layer for removing oxygen remaining in the containers and also oxygen penetrating into the container from the outside. Oxygen absorbers (deoxidizers) used for the oxygen-absorbing layer include, for example, those mainly containing a reducing substance such as iron powder (see, Japanese Examined Patent Publication (JP KOKOKU) No. Sho 62-1824).

A method in which an oxygen absorber such as iron powder is incorporated into a resin, and the resulting resin composition is used as a material for the wall of a container used as a packaging material shows a sufficiently high ability to absorb oxygen, but the resulting resin composition has a color hue peculiar to the iron powder. Therefore, said method is limited in its application and cannot be used in the field of packaging in which transparency is required.

Further, there have been disclosed, as a resin-based oxygen-absorbing material, an oxygen-absorbing resin composition comprising a resin having a carbon-carbon unsaturated bond and a transition metal catalyst (see, Japanese Un-Examined Patent Publication (JP KOKAI) No. 2001-39475, Japanese Un-Examined Patent Publication (JP KOHYO) No. Hei 8-502306 and Japanese Patent No. 3,183,704) and an oxygen-absorbing resin composition comprising a resin having a cyclic olefin (cyclohexene) structure and a transition metal catalyst (in particular, a Co salt) (see, Japanese Un-Examined Patent Publication (JP KOHYO) No. 2003-521552 and Japanese Un-Examined Patent Publication (JP KOKAI) No. 2003-253131). However, the former composition has a problem in that the molecular chain of the resin is cleaved as the resin absorbs oxygen and thus low molecular weight organic components are generated as an odor component. On the other hand, the latter composition comprises ring structures as the oxygen-absorbing sites, and thus it could somewhat inhibit the generation of such low molecular weight organic (odor) components, but there is a tendency that the use of such a transition metal catalyst (a Co salt), and further, an irradiation treatment with ultraviolet rays or the like for activating reactions, may easily result in the occurrence of reactions at sites other than the expected oxygen-absorbing sites and this in turn leads to the formation of decomposition components.

The present inventors have developed an oxygen-absorbing resin composition comprising a polyester manufactured by using as a raw material a mixture of isomers of derivatives (including alkyl substitution compounds) of tetrahydrophthalic anhydride having, at its $\Delta^4$ position, a carbon-carbon double bond (see, the pamphlet of International Patent Publication No. 2005/105887). However, when these resin compositions are to be used for oxygen-absorbing containers, an irradiation treatment or the like is necessary.

SUMMARY OF THE INVENTION

Accordingly, it is an object of the present invention to provide an oxygen-absorbing resin which shows an excellent ability to absorb oxygen without any transition metal catalyst to be added thereto and irradiation treatment to be performed thereon.

The present invention provides an oxygen-absorbing resin obtainable by polymerization of a raw material comprising monomer (A) in which a carbon atom adjacent to a carbon-carbon double bond in an unsaturated alicyclic structure is bonded to an electron donating group and to a hydrogen atom, another carbon atom adjacent to the carbon atom is bonded to a heteroatom-containing functional group or a bonding group derived from the functional group, and the electron donating group and the heteroatom-containing functional group or the bonding group derived from the functional group are in the cis position, wherein an amount of the unsaturated alicyclic structure included in the oxygen-absorbing resin is from 0.5 meq/g to 10 meq/g.

The present invention also provides an oxygen-absorbing resin composition comprising the foregoing oxygen-absorbing resin.

The present invention also provides an oxygen-absorbing container comprising an oxygen-absorbing layer consisting of the foregoing oxygen-absorbing resin and the foregoing oxygen-absorbing resin composition.

The oxygen-absorbing resin and the oxygen-absorbing resin composition according to the present invention show an excellent ability to absorb oxygen even in the absence of any transition metal catalyst and an irradiation treatment, and thus they could enable the realization of oxygen-absorbing materials showing practically acceptable oxygen-absorbing ability while effectively inhibiting the generation of any low molecular weight odor component.

DETAILED DESCRIPTION OF THE PREFERRED EMBODIMENTS

The present invention is an oxygen-absorbing resin obtainable by polymerization of a raw material comprising monomer (A) in which a carbon atom adjacent to a carbon-carbon double bond in an unsaturated alicyclic structure is bonded to an electron donating group and to a hydrogen atom, another carbon atom adjacent to the carbon atom is bonded to a heteroatom-containing functional group or a bonding group derived from the functional group, and the electron donating group and the heteroatom-containing functional group or the bonding group derived from the functional group are in the cis position.

In the present invention, the unsaturated alicyclic structure may be a heterocyclic structure containing a heteroatom in the ring. Alternatively, the unsaturated alicyclic structure may be either a monocyclic or polycyclic structure, and if the unsaturated alicyclic structure is a polycyclic structure, the rings other than those containing the foregoing carbon atom bonded to the electron donating group may be aromatic rings. The unsaturated alicyclic structure is preferably a 3- to 12-membered monocyclic or polycyclic structure, more preferably a 5- or 6-membered monocyclic structure, and further more preferably a 6-membered monocyclic structure. Particularly, the 6-membered cyclic structure is stable from the view point of energy, and can also be easily synthesized. Accordingly, the 6-membered cyclic structure is preferable as the resin structure of the present invention.

The electron donating group includes for example an alkyl group such as a methyl group, an ethyl group, a propyl group, an isopropyl group, a butyl group, a sec-butyl group, and a tert-butyl group, a hydroxyl group, a methoxy group, an ethoxy group, an amino group, and derivatives thereof. Among these, a methyl group, an ethyl group, a methoxy group, and ethoxy group are preferable, and a methyl group and an ethyl group are more preferable.

The heteroatom-containing functional group or the bonding group derived from the functional group includes for example a hydroxyl group, a carboxyl group, an acid anhydride group, a formyl group, an amide group, a carbonyl group, an amino group, an ether bond, an ester bond, an amide bond, a urethane bond, and a urea bond. A functional group comprising an oxygen atom as the heteroatom or a bonding group derived from the functional group is preferable, and includes for example, a hydroxyl group, a carboxyl group, an acid anhydride group, a formyl group, an amide group, a carbonyl group, an ether bond, an ester bond, an amide bond, a urethane bond and a urea bond. Among these, a hydroxyl group, a carboxyl group, an acid anhydride group, a carbonyl group, an ether bond, an ester bond and an amide bond are more preferable. The resin of the present aspect having any of these functional groups and bonding groups can be prepared through relatively simple synthetic reactions, and thus advantageous for industrial use.

The resin according to the present invention which is obtainable by polymerizing a raw material comprising monomer (A) in which a carbon atom adjacent to a carbon-carbon double bond in an unsaturated alicyclic structure is bonded to an electron donating group and to a hydrogen atom, another carbon atom adjacent to the carbon atom is bonded to a heteroatom-containing functional group or a bonding group derived from the functional group, and the electron donating group and the heteroatom-containing functional group or the bonding group derived from the functional group are in the cis position has a quite high reactivity with oxygen. Accordingly, the resin can exhibit a practically acceptable ability to absorb oxygen without being subjected to any irradiation treatment in the absence of a transition metal catalyst (a transition metal salt as an oxidization catalyst). The reactivity of the oxygen-absorbing resin according to the present invention is activated in accordance with the thermal history of the resin during the synthesis of the resin, the molding processing, and the like. It is possible to enhance the reactivity of the resin by actively applying heat to the resin, and also to suppress the reaction by controlling the thermal history. For example, when the reactivity is suppressed, it is also possible to enhance the reactivity by performing a irradiation treatment on the resin.

Radiations to be used for the irradiation treatment performed on the oxygen-absorbing resin according to the present invention include particle beams, such as electron beams, proton beams, and neutron beams, as well as electromagnetic waves, such as gamma rays, X-rays, visible light rays, and ultraviolet rays. Particularly, among these, light beams, such as the visible light rays and ultraviolet rays, which are low-energy radiations are preferable, and the ultraviolet rays are more preferable. Conditions for the irradiation of the resin with ultraviolet rays are preferably, for example, as follows: UV-A, and an integrated quantity of light ranging from 100 to 10000 mJ/cm$^2$. The best time for the irradiation of the resin with ultraviolet rays is not particularly limited, but when the resin is used as a material for an oxygen-absorbing container, the irradiation of the resin with ultraviolet rays is preferably performed immediately before the airtight sealing of the container after the molding of the resin into a container and the charging of contents into the container, in order to achieve effective use of the oxygen-absorbing properties of the container.

In the oxygen-absorbing resin according to the present invention, the rate of the unsaturated alicyclic structure is preferably 0.5 meq/g to 10 meq/g, more preferably 0.7 meq/g to 7.5 meq/g, and further more preferably 0.9 meq/g to 4.5 meq/g, and especially preferably 1.3 meq/g to 2.5 meq/g. If the rate falls within the above ranges, the resulting oxygen-absorbing resin has a practically acceptable ability to absorb oxygen, is capable of preventing the gelation during the polymerization and molding, and also does not show any significant hue change or any significant strength reduction even after the absorption of oxygen.

For example, a polyester manufactured by using as a raw material a hydroxycarboxylic acid including the unsaturated alicyclic structure is preferable because the rate of the unsaturated alicyclic structure can be controlled at a high level. The hydroxycarboxylic acid includes for example 6-hydroxy-cis-2-methyl-3-cyclohexanecarboxylic acid, 5-hydroxy-cis-2-methyl-3-cyclohexanecarboxylic acid, and 2-hydroxy-cis-5-methyl-3-cyclopentanecarboxylic acid. The rates of the unsaturated alicyclic structure in single polymers of the hydroxycarboxylic acids are 7.2, 7.2, and 8.1 meq/g, respectively. It should be noted that the rate of the unsaturated alicyclic structure is obtainable by NMR, for example.

The oxygen-absorbing resin of the present invention is preferably free of any allylic hydrogen atoms other than those present on the unsaturated alicyclic structure. The allylic hydrogen atoms are relatively easily eliminated and thus quite susceptible to oxygen attack. If the resin has allylic hydrogen atoms on the linear chain structures other than the unsaturated alicyclic structure, low molecular weight decomposition products are easily formed through the molecular cleavage as the oxidation of the allylic positions with oxygen proceeds.

The resin of the present invention may comprise alicyclic structures other than the unsaturated alicyclic structure. In addition, the above resin may comprise, in the other alicyclic structures, relatively low reactive allylic hydrogen atoms which are not included in the unsaturated alicyclic structure. In the case of these resins having the foregoing other alicyclic structures, the allylic hydrogen atoms present in the other alicyclic structures having relatively low reactivity are activated due to the chain transfer of the radicals generated in the unsaturated alicyclic structure, and thus this case is preferable since the oxygen-absorbing ability of the resin may be improved.

The oxygen-absorbing resin according to the present invention includes for example a resin having a repeating structural unit in which the unsaturated alicyclic structure is linked through any bonding group and a pendant type resin in which the unsaturated alicyclic structure is linked with a polymer main chain through any bonding group.

The resin having a repeating structural unit in which the unsaturated alicyclic structure is linked through any bonding group includes for example —(O-A-O—R)$_n$—, —(O—CO-A-CO—O—R)$_n$—, —(O-A-CO—)$_n$—, —(CO—O-A-O—CO—R)$_n$—, —(CO-A-CO—R)$_n$—, —(NH—CO—O-A-O—CO—NH—R)$_n$—, (NH—CO-A-CO—NH—R)$_n$—. In each of the above formulae, A represents the unsaturated alicyclic structure, and R represents a saturated or unsaturated hydrocarbon group having 1 to 12 carbon atoms.

The pendant type resin in which the unsaturated alicyclic structure is linked with a polymer main chain through any bonding group include for example a resin in which the unsaturated alicyclic structure is linked with a polymer chain, such as an ethylene-based chain, an ester-based chain, an amide-based chain, or an ether-based chain, through a bonding group derived from a functional group having a heteroatom, such as an ester bond, an amide bond, an ether bond, or a urethane bond.

The number average molecular weight of the oxygen-absorbing resin according to the present invention is preferably 1,000 to 1,000,000, and more preferably 2,000 to 200,000. If the number average molecular weight is within the above ranges, it is possible to form a film having an excellent processability and durability.

The oxygen-absorbing resin according to the present invention may be used alone or in any combination of at least two of them.

The oxygen-absorbing resin according to the present invention is obtainable by polycondensation using as a raw material a derivative of tetrahydrophthalic acid or tetrahydrophthalic anhydride, for example. The polycondensation may be carried out according to any method known to those skilled in the art. The method for the polycondensation includes, for example, the interfacial polycondensation, the solution polycondensation, the molten polycondensation, and the solid polycondensation.

The oxygen-absorbing resin according to the present invention is preferably a polycondensation polymer comprising as a raw material a derivative of tetrahydrophthalic acid or tetrahydrophthalic anhydride in which a carbon atom adjacent to a carbon-carbon double bond in an unsaturated alicyclic structure is bonded to an electron donating group and to a hydrogen atom, another carbon atom adjacent to the carbon atom is bonded to a heteroatom-containing functional group or a bonding group derived from the functional group, and the electron donating group and the heteroatom-containing functional group or the bonding group derived from the functional group are in the cis position. The derivative is more preferably cis-3-methyl-$\Delta^4$-tetrahydrophthalic acid, a derivative thereof, cis-3-methyl-$\Delta^4$-tetrahydrophthalic anhydride, or a derivative thereof, and further more preferably cis-3-methyl-$\Delta^4$-tetrahydrophthalic acid, or cis-3-methyl-$\Delta^4$-tetrahydrophthalic anhydride. Because easily synthesized, these compounds are especially preferable from the viewpoint of industrial use.

In the present invention, the polycondensation polymer includes polyether, polyester, polyamide, and polycarbonate. However, in the case of using as a monomer a derivative of tetrahydrophthalic acid or tetrahydrophthalic anhydride, which is advantageous from the view point of industrial use, the polycondensation polymer derived therefrom is polyester or polyamide. Among them, polyester is especially preferable.

The polyester according to the present invention may be manufactured by the reaction of a derivative of tetrahydrophthalic acid or tetrahydrophthalic anhydride with monomer (C), which is a diol.

The monomer (C), which is the diol, includes for example ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 19-nonanediol, neopentyl glycol, 1,4-cyclohexane dimethanol, 2-phenylpropanediol, 2-(4-hydroxyphenyl)ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol or derivatives thereof. Aliphatic diols such as diethylene glycol, triethylene glycol, 1,4-butanediol, 1,6-hexanediol are preferable, and 1,4-butanediol is more preferable. If 1,4-butanediol is used, the resulting resin has a high ability to absorb oxygen and a small amount of decomposition products generated in the course of oxidation. These diols may be used alone or in any combination of at least two of them. A small amount of a polyvalent alcohol having three or more hydroxy groups, such as glycerin, trimethylolpropane, or pentaerythritol, may be added.

If the combination of at least two of the above diols is used, the combination of 1,4-butanediol and an aliphatic diol having 5 or more carbon atoms is preferable, and the combination of 1,4-butanediol and 1,6-hexanediol is more preferable. A glass transition temperature of the resulting oxygen-absorbing resin can be easily controlled by using such combinations. If the combination of 1,4-butanediol and an aliphatic diol having 5 or more carbon atoms is used, the ratio of 1,4-butanediol to said aliphatic diol is preferably 70:30 to 99:1 (mol %), and more preferably 80:20 to 95:5 (mol %).

As monomer (B), a dicarboxylic acid comprising an aromatic ring or a derivative thereof, or a hydroxycarboxylic acid comprising an aromatic ring or a derivative thereof may be polymerized with the monomer (A). In particular, a copolymerized polyester using as a raw material the monomer (B) together with the monomers (A) and (C) is preferable.

The dicarboxylic acids comprising an aromatic ring or derivatives thereof include benzenedicarboxylic acids such as phthalic anhydride, isophthalic acid and terephthalic acid, naphthalenedicarboxylic acids such as 2,6-naphthalenedicarboxylic acid, anthracenedicarboxylic acids, phenyl malonic acid, phenylenediacetic acids, phenylenedibutyric acids, bis (p-carboxyphenyl)methane, 4,4'-diphenyletherdicarboxylic acids, p-phenylenedicarboxylic acids and derivatives thereof. The hydroxycarboxylic acids comprising an aromatic ring or derivatives thereof include 2-hydroxybenzoic acid, 3-hydroxybenzoic acid, 4-hydroxybenzoic acid, 2,6-hydroxynaphthoic acid, 2-hydroxyphenylacetic acid, 3-hydroxyphenylacetic acid, 4-hydroxyphenylacetic acid, 3-(4-hydroxyphenyl)butyric acid, 2-(4-hydroxyphenyl)butyric acid, 3-hydroxymethylbenzoic acid, 4-hydroxymethylbenzoic acid, 4-(hydroxymethyl)phenoxyacetic acid, 4-(4-hydroxyphenoxy)benzoic acid, (4-hydroxyphenoxy)acetic acid, (4-hydroxyphenoxy)benzoic acid, mandelic acid, 2-phenylacetic acid, 3-phenylacetic acid and derivatives thereof. Among those, dicarboxylic acids in which a carboxyl group is directly bonded to an aromatic ring or derivatives thereof are preferable and include phthalic anhydride, isophthalic acid, terephthalic acid, 2,6-naphthalenedicarboxylic acid and derivatives thereof. In this connection, said derivatives include esters, acid anhydrides, acid halides, substitution products and oligomers. These dicarboxylic acids and derivatives thereof may be used alone or in any combination of at least two of them. More preferably, the monomer (B) includes a phthalic acid or a derivative thereof. In particular, the monomer (B) preferably includes terephthalic acid, and more preferably includes terephthalic acid and isophthalic acid.

For example, by using as a raw material the monomer (B) together with the monomers (A) and (C) to polymerize a polyester, a resin preventing gelation in polycondensation and having a high degree of polymerization can be obtained and thus extrusion moldability is improved. In addition, its crystallinity of the resin increases and blocking in the resin pellet is inhibited. Accordingly, the handling ability during the molding is improved. Moreover, the mechanical strength of the resin is also improved. That is, the resulting resin has a high ability to absorb oxygen and a small amount of decomposition products, and shows excellent extrusion moldability, handling ability and mechanical strength.

As monomer (D), an aliphatic dicarboxylic acid, an aliphatic hydroxycarboxylic acid, a derivative of these acids, or the like may be polymerized with the monomers (A). In particular, a copolymerized polyester using as a raw material the monomer (D) together with the monomers (A) to (C) is preferable. By copolymerizing the monomer (D), a glass transition temperature of the resulting oxygen-absorbing resin can be easily controlled. These monomers (D) may be used alone or in any combination of at least two of them.

The aliphatic dicarboxylic acids and derivatives thereof include oxalic acid, malonic acid, succinic acid, glutaric acid, adipic acid, pimelic acid, suberic acid, azelaic acid, sebacic acid, undecanedioic acid, dodecanedioic acid, 3,3-dimethyl-pentanedioic acid and derivatives thereof.

The aliphatic hydroxycarboxylic acids and derivatives thereof include glycolic acid, lactic acid, hydroxypivalic acid, hydroxycaproic acid, hydroxyhexanoic acid and derivatives thereof.

Among these, adipic acid and succinic acid are preferable, and adipic acid is particularly preferable.

The oxygen-absorbing resin according to the present invention can be obtained as copolyester by copolymerizing the monomers (A) to (D). In this case, the amount of the monomer (D) unit in the resulting resin is preferably 1 to 25 mol %, more preferably 1 to 15 mol %, and further more preferably 2 to 10 mol %, of all monomer units contained in the resin.

In addition, a small amount of a polycarboxylic acid comprising three or more carboxyl groups, such as a trimellitic acid, a pyromellitic acid, or a butane-1,2,3,4-tetracarboxylic acid, or an anhydride thereof may be added. These acid components may be esterified to be, for example, methyl esters.

The glass transition temperature of the oxygen-absorbing resin according to the present invention is preferably in the range of −8° C. to 15° C., more preferably in the range of −8° C. to 10° C., and further more preferably in the range of −5° C. to −8° C. If said glass transition temperature is within the above range, the oxygen-absorbing resin according to the present invention has an excellent ability to absorb oxygen, especially in the early stage.

A polymerization for the oxygen-absorbing resin according to the present invention, which can be obtained by copolymerizing monomer (A) and monomers (B) to (D), may be carried out according to any method known to those skilled in the art. For example, the polymerization may be carried out by interfacial polycondensation, solution polycondensation, molten polycondensation or solid phase polycondensation. A polymerization catalyst is not necessarily used, but for example if the oxygen-absorbing resin according to the present invention is polyester, it is possible to use usual polyester polymerization catalyst such as titanium-containing, germanium-containing, antimony-containing, tin-containing and aluminum-containing polymerization catalysts. In addition, it is also possible to use any known polymerization catalysts such as nitrogen atom-containing basic compounds, boric acid, boric acid esters, and organic sulfonic acid type compounds.

Moreover, when polymerizing the foregoing monomers, various kinds of additives such as coloration-inhibitory agents and/or antioxidants such as phosphate-containing compounds can be used. The addition of an antioxidant would permit the control of any absorption of oxygen during the polymerization of the monomers and the subsequent molding steps and this in turn permits the inhibition of any quality-deterioration of the resulting oxygen-absorbing resin.

The polyester resin can be used not only as starting resins for the melt processing such as the extrusion molding and the injection molding, but also as a paint after they are dissolved in a proper solvent. When using the polyester resin as a paint, a curing agent such as an isocyanate type one may be incorporated into the resin to give a two-pack type adhesive for dry lamination.

Moreover, the oxygen-absorbing resin according to the present invention may be copolymerized through transesterification of the polyester with a saturated polyester resin. With only the polymerization of the polyester, it is difficult to obtain a high molecular weight resin, and accordingly, a resin having a practically sufficient strength cannot be obtained in some cases. However, such copolymerization makes it possible to cause the resin to have a high molecular weight, and to securely provide the resin with strength acceptable in practical use. The saturated polyester resin includes polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone, and polyhydroxyalkanoate. The rate of the unsaturated alicyclic structure in the oxygen-absorbing resin after the copolymerization is preferably 0.5 meq/g to 10 meq/g, more preferably 0.7 meq/g to 7.5 meq/g, furthermore preferably 0.9 meq/g to 4.5 meq/g, and especially preferably 1.3 meq/g to 2.5 meq/g. If the rate falls within the above ranges, the resulting oxygen-absorbing resin has a practically acceptable ability to absorb oxygen, and also does not show any significant hue change or any significant strength reduction even after the absorption of oxygen. The number average molecular weight of the oxygen-absorbing resin after the copolymerization is preferably 1,000 to 1,000,000, and more preferably 2,000 to 200,000.

The copolymerization through transesterification is preferable because it can be easily achieved by reactive extrusion, for example.

Alternatively, the polyester can be copolymerized by the reaction with a resin having a reactive functional group in its terminal or side chain, for example, a polyether such as polyethylene glycol, polyamide, and acid-modified polyolefin.

Further, another type of thermoplastic resin may be incorporated into the oxygen-absorbing resin of the present invention to thus form an oxygen-absorbing resin composition. As the thermoplastic resin, any type of thermoplastic resin may be used.

The thermoplastic resin includes for example low-density polyethylene, medium-density polyethylene, high-density polyethylene, linear low-density polyethylene, linear very low-density polyethylene, polypropylene, poly-1-butene, poly-4-methyl-1-pentene, polyolefins such as random or block copolymers of α-olefins (such as ethylene, propylene, 1-butene and 4-methyl-1-pentene), cyclic olefin polymer (COP) and cyclic olefin copolymer (COC), acid-modified polyolefins such as maleic anhydride-grafted polyethylene and maleic anhydride-grafted polypropylene, ethylene-vinyl compound copolymers such as ethylene-vinyl acetate copolymer, ethylene-vinyl alcohol copolymer, ethylene-vinyl chloride copolymer, ethylene-(meth) acrylic acid copolymer, ionic crosslinked products thereof (ionomers) and ethylene-methyl methacrylate copolymer, styrenic resins such as polystyrene, acrylonitrile-styrene copolymer and α-methyl-styrene-styrene copolymer, polyvinyl compounds such as poly(methyl acrylate) and poly(methyl methacrylate), polyamides such as nylon 6, nylon 66, nylon 610, nylon 12 and poly(m-xylylene adipamide) (MXD6), polyesters such as polyethylene terephthalate (PET), polybutylene terephthalate (PBT), poly(trimethylene terephthalate) (PTT), polyethylene naphthalate (PEN), glycol-modified polyethylene terephthalate (PETG), polyethylene succinate (PES), polybutylene succinate (PBS), poly(lactic acid), poly(glycolic acid), poly(caprolactone) and poly(hydroxy alkanoate), polycarbonates, polyethers such as polyethylene oxide, and mixtures thereof.

The thermoplastic resin is preferably polyethylene, and especially preferably low-density polyethylene. The linear low-density polyethylene which is a copolymer of ethylene and 1-alkene is more preferable. A film and sheet formed by blending the oxygen-absorbing resin and the linear low-density polyethylene have an excellent impact resistance. 1-propylene, 1-butene, 1-pentene, 1-hexene, 1-octene and mixtures thereof can be used as the 1-alkene. The amount of 1-alkene in the copolymer is preferably 2 to 30 wt %, and more preferably 2 to 20 wt %.

For the copolymerization of ethylene and 1-alkene, a catalyst to be used may be selected from any of the conventional Ziegler-Natta catalyst and a single site catalyst, as long as the resulting polymer obtained by use of the catalyst possesses the desired molecular structure. Particularly, the polymerization which is carried out through the use of a single-site catalyst would be able to suppress variation in the compositional ratio for copolymerization throughout all of the molecular weight components. As a result, the resulting copolymer has a uniform molecular structure and thus if the oxidation of the thermoplastic resin is induced by the chain transfer of the radicals of the oxygen-absorbing resin, the molecular chains constituting the copolymer are uniformly oxidized. Therefore, this copolymerization carried out in such a way is preferable because the formation of any decomposition product due to molecular breakage can be inhibited. A preferable catalyst includes metallocene type ones. The other catalyst includes those for the polymerization of olefins which are recognized to be post-metallocene catalysts and, in particular, phenoxyimine catalysts (FI Catalyst), which are regarded as post metallocene catalysts, are preferable.

It is preferred that the aforementioned linear low density polyethylene is for example copolymers of ethylene and 1-olefin prepared using a metallocene type catalyst as a polymerization catalyst, such as copolymers of ethylene and 1-butene, copolymers of ethylene and 1-hexene and copolymers of ethylene and 1-octene. These resins may be used alone or in any combination of at least two of them.

The preparation of the foregoing resin through the polymerization using a single-site catalyst may be carried out using any industrially acceptable method, but it is preferably carried out according to the liquid phase technique since this technique has been most widely employed in this field.

The foregoing thermoplastic resins may be used alone or in any combination of at least two of them.

The foregoing thermoplastic resin may comprise a filler, a coloring agent, a heat stabilizer, a weathering agent, an antioxidant, an age resister, a light stabilizer, a UV absorber, an antistatic agent, a lubricating agent such as a metal soap or a wax, and/or an additive such as a modifier resin or rubber. However, if the foregoing thermoplastic resin comprises an antioxidant, the addition amount thereof is preferably restricted to a small amount because the antioxidant may inhibit the oxygen absorption reaction of the oxygen-absorbing resin. The amount of the antioxidant in the thermoplastic resin is preferably 100 ppm or less, more preferably 10 ppm or less and especially preferably 0 ppm.

The amount of the oxygen-absorbing resin of the oxygen-absorbing resin composition is preferably 3 to 80 wt %, more preferably 10 to 60 wt % and further more preferably 20 to 50 wt %. If the amount falls within the above ranges, the resulting oxygen-absorbing resin composition has a practically acceptable ability to absorb oxygen and the resin does not show any significant hue change or any significant strength reduction even after the absorption of oxygen.

The rate of the unsaturated alicyclic structures present in the oxygen-absorbing resin composition is preferably 0.5 meq/g to 10 meq/g and more preferably 0.7 meq/g to 7.5 meq/g, further more preferably 0.9 meq/g to 4.5 meq/g, and especially preferably 1.3 meq/g to 2.5 meq/g. If the rate falls within the above ranges, the resulting oxygen-absorbing resin composition has a practically acceptable ability to absorb oxygen and the resin composition does not show any significant hue change or any significant strength reduction even after the absorption of oxygen.

The oxygen-absorbing resin and the oxygen-absorbing resin composition according to the present invention may further comprise a plasticizer. The plasticizer defined herein includes all of those which are compatible with the oxygen-absorbing resin according to the present invention and have a property decreasing a glass transition temperature.

The plasticizer includes phthalate ester plasticizers, adipate ester plasticizers, azelate ester plasticizers, sebacate ester plasticizers, phosphate ester plasticizers, trimellitate ester plasticizers, citrate ester plasticizers, fatty acid glycerine ester, epoxy plasticizers, polyester plasticizers and chlorinated paraffin plasticizers. Specifically, the plasticizer includes dimethyl phthalate, diethyl phthalate, dibutyl phthalate, di-2-ethylhexyl phthalate, tributyl acetylcitrate, methyl acetylricinoleate, di-2-ethylhexyl adipate, diisodecyl adipate, ethanediolmontanic acid ester, 1,3-butanediolmontanic acid ester, isobutyl stearate, medium-chain fatty acid triglyceride, poly(1,3-butanediol adipic acid)ester, poly(propylene glycol adipic acid-co-lauric acid)ester, poly(1,3-butylene glycol-co-1,4-butylene glycol adipic acid)ester terminated with octyl alcohol. The amount of the plasticizer in the oxygen-absorbing resin and the oxygen-absorbing resin composition is preferably 0.1 to 20 wt %, more preferably 0.5 to 10 wt %, and especially preferably 1 to 5 wt %.

The oxygen-absorbing resin and the oxygen-absorbing resin composition of the present invention may further comprise a variety of additives such as a radical polymerization initiator and a photosensitizer.

The radical polymerization initiator and photosensitizer include those currently known as photopolymerization initiators such as benzoins and their alkyl ethers such as benzoin, benzoin methyl ether, benzoin ethyl ether and benzoin isopropyl ether; acetophenones such as acetophenone, 2,2- dimethoxy-2-phenylacetophenone, 2,2-diethoxy-2-phenylacetophenone, 1,1-dichloroacetophenone, 1-hydroxycyclohexylphenylketone, 2-hydroxycyclohexylphenylketone and 2-methyl-1-[4-(methylthio)phenyl]-2-morpholino-propan-1-one; anthraquinones such as 2-methylanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenonedimethylketal and benzyldimethylketal; benzophenones such as benzophenone; and xanthones. Such photo- and radical-polymerization initiators may be used in combination with one or at least two conventionally known and currently used photopolymerization accelerator such as benzoic acid initiators or tertiary amine initiators.

Other additives include fillers, coloring agents, heat stabilizers, weatherable stabilizers, antioxidants, age resistors, light stabilizers, ultraviolet light absorbers, antistatic agents, lubricants such as metallic soaps and waxes, modifier resins or rubber and these additives may be incorporated into the resin or the resin composition according to any formulation known per se. For example, the blending a lubricant into the resin or the resin composition would improve the ability of a screw to bite the resin. The lubricants generally used herein are metallic soaps such as magnesium stearate and calcium stearate; those mainly comprising hydrocarbons such as liquid paraffin, naturally occurring and synthetic paraffin, microwaxes, polyethylene waxes and chlorinated polyethylene waxes; aliphatic acid lubricants such as stearic acid and lauric acid; aliphatic acid monoamide and bisamide lubricants such as stearic acid amide, palmitic acid amide, oleic acid amide, esilic acid amide, methylene bis-stearamide and ethylene bis-stearamide; ester lubricants such as butyl stearate, hardened castor oil and ethylene glycol monostearate; and mixtures thereof. If the antioxidants is incorporated into the resin or the resin composition, as mentioned above, it is preferred that the incorporating amount of the antioxidants is restricted to the small amount.

The oxygen-absorbing resin and the oxygen-absorbing resin composition according to the present invention may be used for absorbing oxygen present in an airtightly sealed package, in the form of, for example, powder, granules or a sheet. Moreover, they may be incorporated into a resin or rubber for a liner, a gasket or for forming a coating film in order to absorb the oxygen remaining in a package. In particular, the oxygen-absorbing resin and the oxygen-absorbing resin composition according to the present invention are preferably used as an oxygen-absorbing container made of a laminate which comprises at least one layer containing the resin or the resin composition and one or a plurality of layers of other resins.

The oxygen-absorbing container of the present invention comprises at least one layer (hereunder referred to as an "oxygen-absorbing layer") consisting of the foregoing oxygen-absorbing resin and oxygen-absorbing resin composition.

The materials for forming the layers other than the oxygen-absorbing layer, which constitute the oxygen-absorbing container of the present invention, may appropriately be selected from the group consisting of thermoplastic resins, thermosetting resins, and inorganic materials such as metals and paper while taking into consideration the modes of applications and required functions thereof. For example, the thermoplastic resins listed above in connection with the thermoplastic resins capable of being incorporated into the oxygen-absorbing resin according to the present invention, metal foils and inorganic vapor deposition films can be mentioned.

Regarding the oxygen-absorbing container of the present invention, an oxygen-barrier layer is preferably arranged at least on the outer side of the oxygen-absorbing layer for the further improvement of the effect of the oxygen-absorbing resin or the oxygen-absorbing resin composition. Such a construction of the container would allow the effective absorption of the external oxygen possibly penetrating into the container and the oxygen remaining in the container to thus control the oxygen concentration in the container to a considerably low level over a long period of time.

The oxygen-barrier layer may be prepared using a resin having oxygen-barrier characteristic properties (oxygen-barrier resin). Such an oxygen-barrier resin may be, for instance, ethylene-vinyl alcohol copolymers (EVOH). Also usable herein as an oxygen-barrier resin may be, for example, a saponified copolymer obtained by the saponification of an ethylene-vinyl acetate copolymer having an ethylene content ranging from 20 to 60 mole % and preferably 25 to 50 mole % to a degree of saponification of not less than 96 mole % and preferably not less than 99 mole %. Other examples of such oxygen-barrier resins are poly(m-xylyleneadipamide) (MXD6) and poly (glycolic acid). In addition, a nanocomposite material formed by incorporating an inorganic layered compound such as montmorillonite and the like into the above oxygen-barrier resin, the other polyamide resin and the like is preferably used.

In a case where the oxygen-absorbing container of the present invention is, in particular, a film container such as a pouch, usable as such an oxygen-barrier layer may be, for example, a foil of a light metal such as aluminum; a metal foil such as an iron foil, a tin plate foil, a surface-treated steel foil; a metal thin film or a metal oxide thin film formed on a substrate such as a biaxially oriented PET film by the evaporation method; or a diamond-like carbon thin film. It is also possible to use a barrier-coating film obtained by applying an oxygen-barrier coating layer onto a substrate film such as a biaxially oriented PET film.

A material constituting such metal thin films includes iron, aluminum, zinc, titanium, magnesium, tin, copper and silicon, with aluminum being particularly preferred.

A material constituting such metal oxide thin films includes silica, alumina, zirconium oxide, titanium oxide and magnesium oxide, with silica and alumina being particularly preferred. In this connection, these materials may be used in any combination of at least two of them, and further a film of each material may be laminated with that of a material identical to or different from the former material.

The vapor deposition of such a thin film may be carried out according to any known method, for example, a physical vapor deposition technique (PVD technique) such as the vacuum deposition technique, the sputtering technique, the ion plating technique or the Laser-ablation technique; or a chemical vapor deposition technique (CVD technique) such as the plasma chemical vapor deposition technique, the thermal chemical vapor deposition technique or the optical chemical vapor deposition technique.

A material constituting the oxygen-barrier coating includes resins having a high ability to form hydrogen bonds such as polyvinyl alcohol, ethylene-vinyl alcohol copolymers, poly(meth)acrylic acids, poly(allyl-amine), polyacrylamide and polysaccharides, vinylidene chloride resins, and epoxy-amines. In addition, it is also preferred to incorporate an inorganic compound having a lamellar structure such as montmorillonite into these materials.

Moreover, containers having an oxygen-absorbing barrier layer which comprises the foregoing oxygen-barrier resin containing the oxygen-absorbing resin and the oxygen-absorbing resin composition incorporated into the same are preferred as the oxygen-absorbing container of the present invention. In this case, a separate oxygen barrier layer and a separate oxygen-absorbing layer are not necessarily used, and therefore this would permit the simplification of the layer structure of the oxygen-absorbing container.

The oxygen-absorbing container may be produced by any molding method known per se.

For example, extrusion molding operations can be carried out using a number of extruders corresponding to the kinds of the resins used and a multilayered and multiple die to thus form a multi-layer film, a multi-layer sheet, a multi-layer parison or a multi-layer pipe. Alternatively, a multi-layer preform for molding bottles may be prepared according to a co-injection molding technique such as the simultaneous injection method or the sequential injection method using a number of extruders corresponding to the kinds of the resins used. Such a multi-layer film, parison or preform can be further processed to thus form an oxygen-absorbing multi-layered container.

The packaging material such as a film may be used as pouches having a variety of shapes, and a capping material for trays and cups. Examples of such pouches include three sided seal or four sided seal flat pouches, gusseted pouches, standing pouches and pillow-shaped packaging bags. These bags may be prepared by any known bag-manufacturing method. Moreover, a film or a sheet can be subjected to a molding means such as the vacuum forming technique, the pressure forming technique, the stretch forming technique and the plug-assist forming technique to thus obtain a packaging container having a cup-like or tray-like shape.

A multi-layer film or a multi-layer sheet may be prepared using, for instance, the extrusion coating technique or the sandwich-lamination technique. In addition, single-layer and multi-layer films, which have been formed in advance, can be laminated together by the dry-lamination technique. Such methods specifically include, for example, a method in which a transparent vapor deposited film can be laminated with a co-extruded film having a three-layer structure—a thermoplastic resin layer/an oxygen-absorbing layer/a thermoplastic resin (sealant) layer—through the dry-lamination technique; a method in which two layers—an oxygen-absorbing layer/a sealant layer—can be extrusion-coated, through an anchoring agent, with a two-layer film comprising biaxially oriented PET film/aluminum foil laminated together by the dry-lamination technique; or a method in which a polyethylene single-layer film is sandwich-laminated, through a polyethylene-based oxygen-absorbing resin composition, with a two-layer film comprising barrier coating film/polyethylene film which are laminated by the dry-lamination technique, but the present invention is not restricted to these specific methods at all.

Furthermore, a bottle or a tube may easily be formed by pinching off a parison, a pipe or a preform by using a pair of split molds and then blowing a fluid through the interior thereof. Moreover, a pipe or a preform is cooled, then heated to an orientation temperature and oriented in the axial direction while blow-orientating the same in the circumferential direction by the action of a fluid pressure to thus form a stretch blow-molded bottle.

The oxygen-absorbing container of the present invention can effectively inhibit any penetration of external oxygen into the container through the wall thereof and can absorb the oxygen remaining in the container. For this reason, the container is quite useful since it permits the maintenance of the internal oxygen concentration at a quite low level over a long period of time, the prevention of any quality deterioration of the content thereof due to the action of oxygen present therein and the prolonging of the shelf life of the content.

The oxygen-absorbing resin or composition of the present invention can thus be used for the packaging of contents quite susceptible to deterioration in the presence of oxygen, in particular, foods such as coffee beans, tea leaves (green tea), snacks, baked confectionery prepared from rice, Japanese unbaked and semi-baked cakes, fruits, nuts, vegetables, fish and meat products, pasted products, dried fish and meat, smoked fish and meat, foods boiled in soy sauce, uncooked and cooked rice products, infant foods, jam, mayonnaise, ketchup, edible fats and oils, dressings, sauces and dairy products; beverages such as beer, wine, fruit juices, green tea, and coffee; and other products such as pharmaceutical preparations, cosmetic products and electronic parts, but the present invention is not restricted to these specific ones at all.

EXAMPLES

The present invention will hereunder be described in more detail with reference to the following examples. In the following examples, each numerical value was determined according to the method specified below:

(1) Relative Proportion of Isomers of Methyltetrahydrophthalic anhydride within Raw Material Using a nuclear magnetic resonance spectroscopy ($^1$H-NMR, EX270 available from JEOL DATUM LTD.), relative proportions of the isomers of methyltetrahydrophthalic anhydride within the raw materials were calculated from area ratio of signals of methyl protons from cis-3-methyl-$\Delta^4$-tetrahydrophthalic anhydride (1.35 to 1.4 ppm), methyl protons from trans-3-methyl-$\Delta^4$-tetrahydrophthalic anhydride (1.25 to 1.3 ppm), methyl protons from 4-methyl-$\Delta^4$-tetrahydrophthalic anhydride (1.8 ppm). The solvent used herein is deuterochloroform containing tetramethylsilane as a reference material.

(2) Number Average Molecular Weight (Mn) and Molecular Weight Distribution (Mw/Mn)

This was determined by the gel permeation chromatography (GPC) technique (HLC-8120 Model GPC available from Tosoh Corporation) and expressed in terms of the value relative to that of the polystyrene. In this case, chloroform was used as the solvent.

(3) Relative Proportions of the Monomer Units in the Copolyester Resin

Using the nuclear magnetic resonance spectroscopy ($^1$H-NMR, EX270 available from JEOL DATUM LTD.), relative proportions of the acid components contained in the resin were calculated from area ratio of signals of proton of benzene ring from telephthalic acid (8.1 ppm), proton of benzene ring from isophthalic acid (8.7 ppm), methylene proton adjacent to ester groups derived from terephthalic acid and isophthalic acid (4.3 to 4.4 ppm), methylene proton adjacent to ester groups derived from methyltetrahydrophthalic anhydride (4.1 to 4.2 ppm), methyl protons from cis-3-methyl-$\Delta^4$-tetrahydrophthalic anhydride (1.05 to 1.1 ppm), methyl protons from trans-3-methyl-$\Delta^4$-tetrahydrophthalic anhydride (1.1 to 1.15 ppm), methyl protons from 4-methyl-$\Delta^4$-tetrahydrophthalic anhydride (1.6 to 1.65 ppm). The solvent used herein is deuterochloroform containing tetramethylsilane as a reference material.

In this connection, it was confirmed that the relative proportions of the acid components in the resins were substantially identical to the amounts (mole ratio) of monomers used in the polymerization.

(4) Glass Transition Point (Tg)

This was determined in a nitrogen gas stream at a rate of temperature rise of 10° C./min using a differential scanning calorimeter (DSC6220 available from Seiko Instruments Inc.).

(5) Amount of Oxygen Absorbed

A specimen cut out was introduced into an oxygen-impermeable steel foil-laminated cup having an inner volume of 85 cm$^3$, then the cup was heat sealed with an aluminum foil-laminated film cap and stored within an atmosphere maintained at 22° C. After storage of the cup for a predetermined time period, the oxygen gas concentration within the cup was determined by a micro-gas chromatograph (M-200 available from Agirent Technology Co., Ltd.) to thus calculate the amount of oxygen absorbed per 1 cm$^2$ of the specimen.

Example 1

To a 500 ml volume separable flask equipped with a stirring machine, a nitrogen gas-introduction tube and a Dean-Stark type water separator, were added 6.2 g of cis-3-methyl-Δ$^4$-tetrahydrophthalic anhydride (available from Tokyo Chemical Industry Co., Ltd.) as monomer (A), 24.0 g of terephthalic acid (available from Wako Pure Chemical Industries, Ltd.; TPA) as monomer (B), 52.1 g of 1,4-butanediol (available from Wako Pure Chemical Industries, Ltd.; BG) as monomer (C), 17.8 g of 4-methyl-Δ$^4$-tetrahydrophthalic anhydride (available from Tokyo Chemical Industry Co., Ltd.) as another monomer, 0.030 g of isopropyl titanate (available from Kishida Chemical Co., Ltd.) as a polymerization catalyst, and 10 ml of toluene, and the reaction of these components was continued at a temperature ranging from 150° C. to 200° C. in a nitrogen atmosphere over about 6 hours, while removing the water generated. Subsequently, the toluene was removed from the reaction system, and finally the polymerization was carried out under a reduced pressure of 0.1 kPa at 200° C. for about 6 hours to obtain rubber-like copolyester resin E having a Tg of 7.3° C. Mn and Mw/Mn of the copolyester resin E were about 4,500 and 6.0, respectively.

The resulting resin E was formed into a sheet having an average thickness of about 270 μm using a hot press maintained at 200° C., and then a specimen of 20 cm$^2$ was cut off from the sheet and used for the evaluation of the amount of absorbed oxygen. The results thus obtained are summarized in Table 1.

Example 2

The same polymerization as that of Example 1 was repeated, except that the following composition of monomers was used, to obtain rubber-like copolyester resin F having a Tg of 7.4° C.

monomer (A): cis-3-methyl-Δ$^4$-tetrahydrophthalic anhydride 8.2 g;

monomer (B): TPA 24.0 g;

monomer (C): BG 52.1 g; and another monomer: 4-methyl-Δ$^4$-tetrahydrophthalic anhydride 15.8 g.

Mn and Mw/Mn of the copolyester resin F were about 4600 and 6.0, respectively.

The resulting resin F was used for the evaluation of the amount of absorbed oxygen using the same way as that of Example 1. The results thus obtained are summarized in Table 1.

Example 3

The same polymerization as that of Example 1 was repeated, except that the following composition of monomers was used, to obtain rubber-like copolyester resin G having a Tg of 11.4° C.

monomer (A): cis-3-methyl-Δ$^4$-tetrahydrophthalic anhydride 24.0 g;

monomer (B): TPA 24.0 g; and monomer (C): BG 52.1 g.

Mn and Mw/Mn of the copolyester resin G were about 6700 and 6.6, respectively.

The resulting resin G was used for the evaluation of the amount of absorbed oxygen using the same way as that of Example 1. The results thus obtained are summarized in Table 1.

Example 4

The same polymerization as that of Example 1 was repeated, except that the following composition of monomers was used, to obtain rubber-like copolyester resin H having a Tg of 11.7° C.

monomer (A): cis-3-methyl-Δ$^4$-tetrahydrophthalic anhydride 24.0 g;

monomer (B): TPA 21.6 g and isophthalic acid (available from Wako Pure Chemical Industries, Ltd.; IPA) 2.4 g; and monomer (C): BG 52.1 g.

Mn and Mw/Mn of the copolyester resin H were about 6600 and 6.5, respectively.

The resulting resin H was used for the evaluation of the amount of absorbed oxygen using the same way as that of Example 1. The results thus obtained are summarized in Table 1.

Example 5

The same polymerization as that of Example 1 was repeated, except that the following composition of monomers was used, to obtain rubber-like copolyester resin I having a Tg of 3.1° C.

monomer (A): cis-3-methyl-Δ$^4$-tetrahydrophthalic anhydride 38.4 g;

monomer (B): TPA 9.6 g; and monomer (C): BG 52.1 g.

Mn and Mw/Mn of the copolyester resin I were about 4800 and 6.2, respectively.

The resulting resin I was used for the evaluation of the amount of absorbed oxygen using the same way as that of Example 1. The results thus obtained are summarized in Table 1.

Example 6

The same polymerization as that of Example 1 was repeated, except that the following composition of monomers was used, to obtain rubber-like copolyester resin J having a Tg of 7.6° C.

monomer (A): cis-3-methyl-Δ$^4$-tetrahydrophthalic anhydride 24.0 g;

monomer (B): TPA 24.0 g; and monomer (C): BG 46.9 g and 1,6-hexanodiol (available from Wako Pure Chemical Industries, Ltd.; HG) 6.8 g.

Mn and Mw/Mn of the copolyester resin J were about 6800 and 6.9, respectively.

The resulting resin J was used for the evaluation of the amount of absorbed oxygen using the same way as that of Example 1. The results thus obtained are summarized in Table 1.

Example 7

The same polymerization as that of Example 1 was repeated, except that the following composition of monomers was used, to obtain rubber-like copolyester resin K having a Tg of 5.1° C.

monomer (A): cis-3-methyl-$\Delta^4$-tetrahydrophthalic anhydride 24.0 g;
monomer (B): TPA 24.0 g; and
monomer (C): BG 41.7 g and HG 13.7 g.

Mn and Mw/Mn of the copolyester resin K were about 7100 and 7.2, respectively.

The resulting resin K was used for the evaluation of the amount of absorbed oxygen using the same way as that of Example 1. The results thus obtained are summarized in Table 1.

Example 8

The same polymerization as that of Example 1 was repeated, except that the following composition of monomers was used, to obtain rubber-like copolyester resin L having a Tg of 3.9° C.

monomer (A): cis-3-methyl-$\Delta^4$-tetrahydrophthalic anhydride 24.0 g;
monomer (B): TPA 19.2 g;
monomer (C): BG 52.1 g; and
monomer (D): succinic acid (available from Wako Pure Chemical Industries, Ltd.; SA) 3.4 g.

Mn and Mw/Mn of the copolyester resin L were about 6900 and 8.2, respectively.

The resulting resin L was used for the evaluation of the amount of absorbed oxygen using the same way as that of Example 1. The results thus obtained are summarized in Table 1.

Example 9

The same polymerization as that of Example 1 was repeated, except that the following composition of monomers was used, to obtain rubber-like copolyester resin M having a Tg of 4.2° C.

monomer (A): cis-3-methyl-$\Delta^4$-tetrahydrophthalic anhydride 24.0 g;
monomer (B): TPA 21.6 g;
monomer (C): BG 52.1 g; and
monomer (D): adipic acid (available from Wako Pure Chemical Industries, Ltd.; AA) 2.1 g.

Mn and Mw/Mn of the copolyester resin M were about 6700 and 7.8, respectively.

The resulting resin M was used for the evaluation of the amount of absorbed oxygen using the same way as that of Example 1. The results thus obtained are summarized in Table 1.

Example 10

The same polymerization as that of Example 1 was repeated, except that the following composition of monomers was used, to obtain rubber-like copolyester resin N having a Tg of –0.2° C.

monomer (A): cis-3-methyl-$\Delta^4$-tetrahydrophthalic anhydride 24.0 g;
monomer (B): TPA 19.2 g;
monomer (C): BG 52.1 g; and
monomer (D): AA 4.2 g.

Mn and Mw/Mn of the copolyester resin N were about 7200 and 9.2, respectively.

The resulting resin N was used for the evaluation of the amount of absorbed oxygen using the same way as that of Example 1. The results thus obtained are summarized in Table 1.

Example 11

The same polymerization as that of Example 1 was repeated, except that the following composition of monomers was used, to obtain rubber-like copolyester resin 0 having a Tg of –0.2° C.

monomer (A): cis-3-methyl-$\Delta^4$-tetrahydrophthalic anhydride 24.0 g;
monomer (B): TPA 16.8 g;
monomer (C): BG 52.1 g; and
monomer (D): AA 6.2 g.

Mn and Mw/Mn of the copolyester resin M were about 7100 and 9.5, respectively.

The resulting resin O was used for the evaluation of the amount of absorbed oxygen using the same way as that of Example 1. The results thus obtained are summarized in Table 1.

Comparative Example 1

The same polymerization as that of Example 1 was repeated, except that the following composition of monomers was used, to obtain rubber-like copolyester resin P having a Tg of 8.1° C.

monomer (B): TPA 24.0 g;
monomer (C): BG 52.1 g; and
another monomer: 4-methyl-$\Delta^4$-tetrahydrophthalic anhydride 24.0 g.

Mn and Mw/Mn of the copolyester resin P were about 6500 and 6.4, respectively.

The resulting resin P was used for the evaluation of the amount of absorbed oxygen using the same way as that of Example 1. The results thus obtained are summarized in Table 1.

Comparative Example 2

The same polymerization as that of Example 1 was repeated, except that the following composition of monomers was prepared using isomer mixture of methyltetrahydrophthalic anhydride (available from Hitachi Chemical Co., Ltd.; HN-2200) containing 20.6% of cis-3-methyl-$\Delta^4$-tetrahydrophthalic anhydride, 48.0% of trans-3-methyl-$\Delta^4$-tetrahydrophthalic anhydride, and 31.4% of 4-methyl-$\Delta^4$-tetrahydrophthalic anhydride, to obtain rubber-like copolyester resin Q having a Tg of 8.0° C.

monomer (A): HN-2000 24.0 g (20.6% thereof corresponds to monomer (A));
monomer (B): TPA 24.0 g;

monomer (C): BG 52.1 g; and

Mn and Mw/Mn of the copolyester resin Q were about 7000 and 7.7, respectively.

The resulting resin Q was used for the evaluation of the amount of absorbed oxygen using the same way as that of Example 1. The results thus obtained are summarized in Table 1.

Example 12

To a 500 ml volume separable flask equipped with a stirring machine, a nitrogen gas-introduction tube and a Dean-Stark type water separator, were added 48.0 g of cis-3-methyl-$\Delta^4$-tetrahydrophthalic anhydride as monomer (A), 52.1 g of 1,4-butanediol as monomer (C), 0.030 g of isopropyl titanate as a polymerization catalyst, and 10 ml of toluene, and the reaction of these components was continued at a temperature ranging from 150° C. to 200° C. in a nitrogen atmosphere over about 6 hours, while the water generated was removed. Subsequently, the toluene was removed from the reaction system, and finally the polymerization was carried out under a reduced pressure of 0.1 kPa at 200° C. for about 6 hours to obtain rubber-like polyester resin R. Mn and Mw/Mn of the polyester resin R were about 2,800 and 8.0, respectively.

In a reaction vessel equipped with a stirring machine, 10 g of the resin R thus obtained and 10 g of polybutylene terephthalate copolymer (PBT, available from Polyplastics Co., Ltd.; DURANEX 600LP) were stirred over about 1 hour under a reduced pressure of 0.2 kPa or less while being heated at a temperature ranging from 200° C. to 240° C., so as to undergo transesterification copolymerization, thereby obtaining a solid copolyester resin S having a Tg of 6.0° C. Mn and Mw/Mn of the copolyester resin S were about 9000 and 2.9, respectively.

The resulting resin S was used for the evaluation of the amount of absorbed oxygen using the same way as that of Example 1. The results thus obtained are summarized in Table 1.

Example 13

In a reaction vessel equipped with a stirring machine, 10 g of the resin R obtained in Example 12 and 10 g of polybutylene succinate (PBS, available from Mitsubishi Chemical Corporation; GS-PLa) were stirred over about 0.5 hour under a reduced pressure of 0.2 kPa or less while being heated at a temperature ranging from 200° C. to 240° C., so as to undergo transesterification copolymerization, thereby obtaining a solid copolyester resin T having a Tg of −25.1° C. Mn and Mw/Mn of the copolyester resin T were about 6800 and 2.7, respectively.

The resulting resin T was used for the evaluation of the amount of absorbed oxygen using the same way as that of Example 1. The results thus obtained are summarized in Table 1.

TABLE 1

| Example | Oxygen-absorbing resin | A | B TPA | B IPA | C BG | C HG | D AA | D SA | Others |
|---|---|---|---|---|---|---|---|---|---|
| 1 | E | 13 | 50 | — | 100 | — | — | — | 37 |
| 2 | F | 17 | 50 | — | 100 | — | — | — | 33 |
| 3 | G | 50 | 50 | — | 100 | — | — | — | — |
| 4 | H | 50 | 45 | 5 | 100 | — | — | — | — |
| 5 | I | 80 | 20 | — | 100 | — | — | — | — |
| 6 | J | 50 | 50 | — | 90 | 10 | — | — | — |
| 7 | K | 50 | 50 | — | 80 | 20 | — | — | — |
| 8 | L | 50 | 40 | — | 100 | — | — | 10 | — |
| 9 | M | 50 | 45 | — | 100 | — | 5 | — | — |
| 10 | N | 50 | 40 | — | 100 | — | 10 | — | — |
| 11 | O | 50 | 35 | — | 100 | — | 15 | — | — |
| *1 | P | 0 | 50 | — | 100 | — | — | — | 50 |
| *2 | Q | 10 | 50 | — | 100 | — | — | — | 40 |
| 12 | S | 48 | 36 | 16 | 100 | — | — | — | — |
| 13 | T | 42 | — | — | 100 | — | — | 58 | — |

| Example | Tg (° C.) | Rate of Unsaturated Alicyclic Structure in Resin (meq/g) | Amount of oxygen Absorbed (ml/cm²) After 3 days | Amount of oxygen Absorbed (ml/cm²) After 7 days | Overall judgment |
|---|---|---|---|---|---|
| 1 | 7.3 | 0.58 | 0.021 | 0.062 | ○ |
| 2 | 7.4 | 0.76 | 0.029 | 0.077 | ○ |
| 3 | 11.4 | 2.2 | 0.061 | 0.119 | ○ |
| 4 | 11.7 | 2.2 | 0.080 | 0.140 | ○ |
| 5 | 3.1 | 3.4 | 0.100 | 0.150 | ○ |
| 6 | 7.6 | 2.2 | 0.082 | 0.197 | ○ |
| 7 | 5.1 | 2.1 | 0.106 | 0.226 | ○ |
| 8 | 3.9 | 2.2 | 0.110 | 0.203 | ○ |
| 9 | 4.2 | 2.2 | 0.082 | 0.201 | ○ |
| 10 | −0.2 | 2.2 | 0.120 | 0.207 | ○ |
| 11 | −5.7 | 2.2 | 0.072 | 0.180 | ○ |
| *1 | 8.1 | 0 | 0.014 | 0.027 | X |
| *2 | 8.0 | 0.46 | 0.016 | 0.044 | X |

TABLE 1-continued

| 12 | 6.0 | 2.1 | 0.048 | 0.104 | ○ |
| 13 | −25.1 | 2.1 | 0.060 | 0.141 | ○ |

*Comparative Example

Example 14

Resin G (50 parts by weight) obtained in Example 3 and metallocene-catalyzed linear low-density polyethylene (m-LLDPE, available from UBE-MARUZEN POLYETHYLENE Co., Ltd.; UMERIT 140HK, 50 parts by weight) as a thermoplastic resin were melt-blended, in a laboratory mixing extruder (available from Tokyo Seiki Co., Ltd.; CS-194AV) at a temperature of 200° C. to obtain a resin composition 1.

The resulting resin composition 1 was formed into a film having an average thickness of about 60 μm using a hot press maintained at a 200° C., and a specimen of 20 cm$^2$ was cut off from the film and used for the evaluation of the amount of absorbed oxygen. The results thus obtained are summarized in Table 2.

Example 15

The same process as that of Example 14 was repeated, except that resin G (50 parts by weight) and a low-density polyethylene (LDPE, available from Sumitomo Chemical Co., Ltd.; L705, 50 parts by weight) as a thermoplastic resin were used, to obtain a resin composition 2.

The resulting resin composition 2 was used for the evaluation using the same way as that of Example 14. The results thus obtained are summarized in Table 2.

Example 16

The same process as that of Example 14 was repeated, except that resin N (50 parts by weight) obtained in Example 10 and metallocene-catalyzed linear low-density polyethylene (140HK, 50 parts by weight) as a thermoplastic resin were used, to obtain a resin composition 3.

The resulting resin composition 3 was used for the evaluation using the same way as that of Example 14. The results thus obtained are summarized in Table 2.

Example 17

Resin G (50 parts by weight), low-density polyethylene (LDPE, L-719 available from UBE-MARUZEN POLYETHYLENE Co., Ltd., 50 parts by weight) as a thermoplastic resin and acetyl tributyl citrate (ATBC, available from ASAHI KASEI FINECHEM CO., LTD., 2.5 parts by weight) as a plasticizer were melt-blended, in a laboratory mixing extruder at a temperature of 200° C. to obtain a resin composition 4. The resin composition 4 had a Tg of 5.8° C. from the oxygen-absorbing resin.

The resulting resin composition 4 was used for the evaluation using the same way as that of Example 14. The results thus obtained are summarized in Table 2.

TABLE 2

| Example | Oxygen-absorbing resin | Thermoplastic resin | Plasticizer | Amount of Oxygen-absorbing resin (wt %) | Amount of Oxygen Absorbed (ml/cm$^2$) | |
| --- | --- | --- | --- | --- | --- | --- |
| | | | | | After 3 days | After 7 days |
| 14 | G | m-LLDPE | — | 50 | 0.025 | 0.060 |
| 15 | G | LDPE | — | 50 | 0.016 | 0.051 |
| 16 | N | LDPE | — | 50 | 0.078 | 0.125 |
| 17 | G | LDPE | ATBC | 49 | 0.068 | 0.128 |

Example 18

The resin G obtained in Example 3 was formed into a film having an average thickness of about 60 μm using a hot press maintained at a 200° C. The film thus obtained was adhered, using a two-pack type urethane adhesive (TAKELACK A-315+TAKENATE A-50 available from Takeda Chemical Industries, Ltd.), to a corona-treated surface of a LDPE film (available from Tamapoly Co., Ltd.; V-1) which was previously corona-treated on one side thereof. Then, the adhesive was cured at 37° C. for three days in a nitrogen atmosphere to thus prepare a two-layer film of resin E/LDPE. Further, a vapor-deposited surface of a 12 μm thick transparent, vapor deposited, biaxially oriented polyethylene terephthalate (PET) film (available from Toppan Printing Co., Ltd.; GL-AE) was thermally laminated with the resulting two layer film on the resin E side of the resulting two-layer film to form an oxygen-absorbing laminate film.

The resulting laminate films were put on top of each other so that the LDPE layers were opposed to one another and the four sides thereof were heat-sealed to obtain a transparent flat pouch having an effective area of 80 cm$^2$ and an inner volume of 15 ml. This flat pouch was stored at 22° C. and then the oxygen concentration within the pouch was monitored using a micro-gas chromatograph (available from Agilent Technologies, Inc.; M200). The results thus obtained are listed in Table 3.

Example 19

The resin composition 1 obtained in Example 14 was formed into a film having an average thickness of about 60 μm using a hot press maintained at a 200° C. An oxygen-absorbing laminate film was obtained using the resulting film in the same way as that of Example 18. Then, a flat pouch was prepared in the same way as that of Example 18, and the oxygen concentration within the pouch was monitored. The results thus obtained are listed in Table 3.

Example 20

The resin composition 3 obtained in Example 16 was formed into a film having an average thickness of about 60 μm using a hot press maintained at a 200° C. An oxygen-absorbing laminate film was obtained using the resulting film in the same way as that of Example 18. Then, a flat pouch was prepared in the same way as that of Example 18, and the oxygen concentration within the pouch was monitored. The results thus obtained are listed in Table 3.

Example 21

The resin composition 4 obtained in Example 17 was formed into a film having an average thickness of about 60 μm using a hot press maintained at a 200° C. An oxygen-absorbing laminate film was obtained using the resulting film in the same way as that of Example 18. Then, a flat pouch was prepared in the same way as that of Example 18, and the oxygen concentration within the pouch was monitored. The results thus obtained are listed in Table 3.

TABLE 3

| | Oxygen concentration within the pouch (%) | | | | | |
|---|---|---|---|---|---|---|
| Example | After 0 day | After 1 day | After 2 days | After 4 days | After 7 days | After 10 days |
| 18 | 20.9 | 18.5 | 12.9 | 2.6 | 0.1 | 0 |
| 19 | 20.9 | 19.4 | 15.7 | 7 | 1.5 | 0.2 |
| 20 | 20.9 | 19.6 | 16.1 | 3.5 | 0.4 | 0 |
| 21 | 20.9 | 18.9 | 15.7 | 3.2 | 0.3 | 0 |

The invention claimed is:

1. An oxygen-absorbing resin obtainable by polymerization of a raw material comprising monomer (A) in which
   a carbon atom adjacent to a carbon-carbon double bond in an unsaturated alicyclic structure is bonded to an electron donating group and to a hydrogen atom,
   another carbon atom adjacent to the carbon atom is bonded to a heteroatom-containing functional group or a bonding group derived from the functional group, and
   the electron donating group and the heteroatom-containing functional group or the bonding group derived from the functional group are in the cis position, wherein
   an amount of the unsaturated alicyclic structure included in the oxygen-absorbing resin is from 0.5 meq/g to 10 meq/g,
wherein the monomer (A) is selected from the group consisting of cis-3-methyl-$\Delta^4$-tetrahydrophthalic acid, a derivative thereof, cis-3-methyl-$\Delta^4$-tetrahydrophthalic anhydride, and a derivative thereof.

2. The oxygen-absorbing resin according to claim 1, wherein a glass transition temperature is in the range of −8° C. to 15° C.

3. The oxygen-absorbing resin according to claim 1, which does not contain any transition metal salt as an oxidation catalyst.

4. The oxygen-absorbing resin according to claim 1, further comprising a plasticizer.

5. The oxygen-absorbing resin according to claim 1, wherein the oxygen-absorbing resin is a polyester obtainable by polymerization with monomer (B) comprising phthalic acid or a derivative thereof.

6. The oxygen-absorbing resin according to claim 5, wherein the monomer (B) comprises terephthalic acid.

7. The oxygen-absorbing resin according to claim 5, wherein the monomer (B) comprises terephthalic acid and isophthalic acid.

8. The oxygen-absorbing resin according to claim 1, wherein the oxygen-absorbing resin is a polyester obtainable by polymerization with monomer (C) that is a diol.

9. The oxygen-absorbing resin according to claim 8, wherein the monomer (C) comprises 1,4-butanediol.

10. The oxygen-absorbing resin according to claim 8, wherein the monomer (C) comprises 1,4-butanediol and 1,6-hexanediol.

11. The oxygen-absorbing resin according to claim 1, wherein the oxygen-absorbing resin is a polyester obtainable by polymerization with monomer (D) selected from the group consisting of aliphatic dicarboxylic acids, aliphatic hydroxycarboxylic acids and derivatives thereof.

12. The oxygen-absorbing resin according to claim 11, wherein the monomer (D) comprises adipic acid.

13. The oxygen-absorbing resin according to claim 11, wherein the monomer (D) comprises succinic acid.

14. An oxygen-absorbing resin composition comprising the oxygen-absorbing resin according to claim 1.

15. The oxygen-absorbing resin composition according to claim 14, further comprising a thermoplastic resin.

16. The oxygen-absorbing resin composition according to claim 15, wherein the thermoplastic resin is polyethylene.

17. An oxygen-absorbing container comprising an oxygen-absorbing layer comprising the oxygen-absorbing resin according to claim 1.

18. The oxygen-absorbing container according to claim 17, further comprising an oxygen-barrier layer on the outside of the oxygen absorbing layer.

* * * * *